United States Patent [19]

Prewitt, Jr. et al.

[11] 4,040,062
[45] Aug. 2, 1977

[54] RECORDING INSTRUMENT

[76] Inventors: Richard H. Prewitt, Jr., 439 N. Broadway, Lexington, Ky. 40508; Richard H. Prewitt, R.R. No. 3, Lexington, Ky. 40505

[21] Appl. No.: 622,229

[22] Filed: Oct. 14, 1975

[51] Int. Cl.² .................. G01D 9/00; G01D 15/02; G01D 15/16; F16C 11/00
[52] U.S. Cl. ........................ 346/7; 346/77 R; 346/124; 308/2 A; 267/163
[58] Field of Search ............. 346/7, 77 R, 124; 308/2 A; 33/147 D, 148 D; 267/154, 163

[56] References Cited

U.S. PATENT DOCUMENTS

| | | | |
|---|---|---|---|
| 2,932,967 | 4/1960 | Prewitt et al. | 73/88 R |
| 3,581,298 | 5/1971 | Billawala | 267/163 X |
| 3,611,798 | 10/1971 | Scott | 346/7 UX |
| 3,725,948 | 4/1973 | Prewitt et al. | 346/77 |
| 3,757,347 | 9/1973 | Endres | 346/7 |

Primary Examiner—George H. Miller, Jr.
Attorney, Agent, or Firm—Frank C. Leach, Jr.

[57] ABSTRACT

A scratch strain gauge has an annular target removably supported on a first plate, which is fixed to a first area of a structure that is to have its strains recorded. The target, which has a groove in its periphery, is driven by flat springs, supported on a second plate, which is fixed to a second area of the structure and longitudinally spaced from the first area. The plates have an interlocking relationship for temperature compensation. A dust seal cover is disposed over the space between the plates and the target. A door is pivotally mounted on the cover and closes an opening formed between the cover and the first plate and through which the target can be inserted and removed. One of the supports for supporting the target is mounted on the door and engages the bottom of the groove. A resiliently mounted support on the first plate also engages the bottom of the groove as does a third support fixed to the first plate. The opening of the door enables the target to be easily removed. Reverse rotation of the target is prevented by a pair of resiliently biased elements engaging the periphery of the target. The driving of the target by the flat springs can be increased or decreased through lever arrangements. A scratch arm, which indicates strains of opposite senses on the target, is supported on the second plate and can have varying amounts of motion.

35 Claims, 29 Drawing Figures

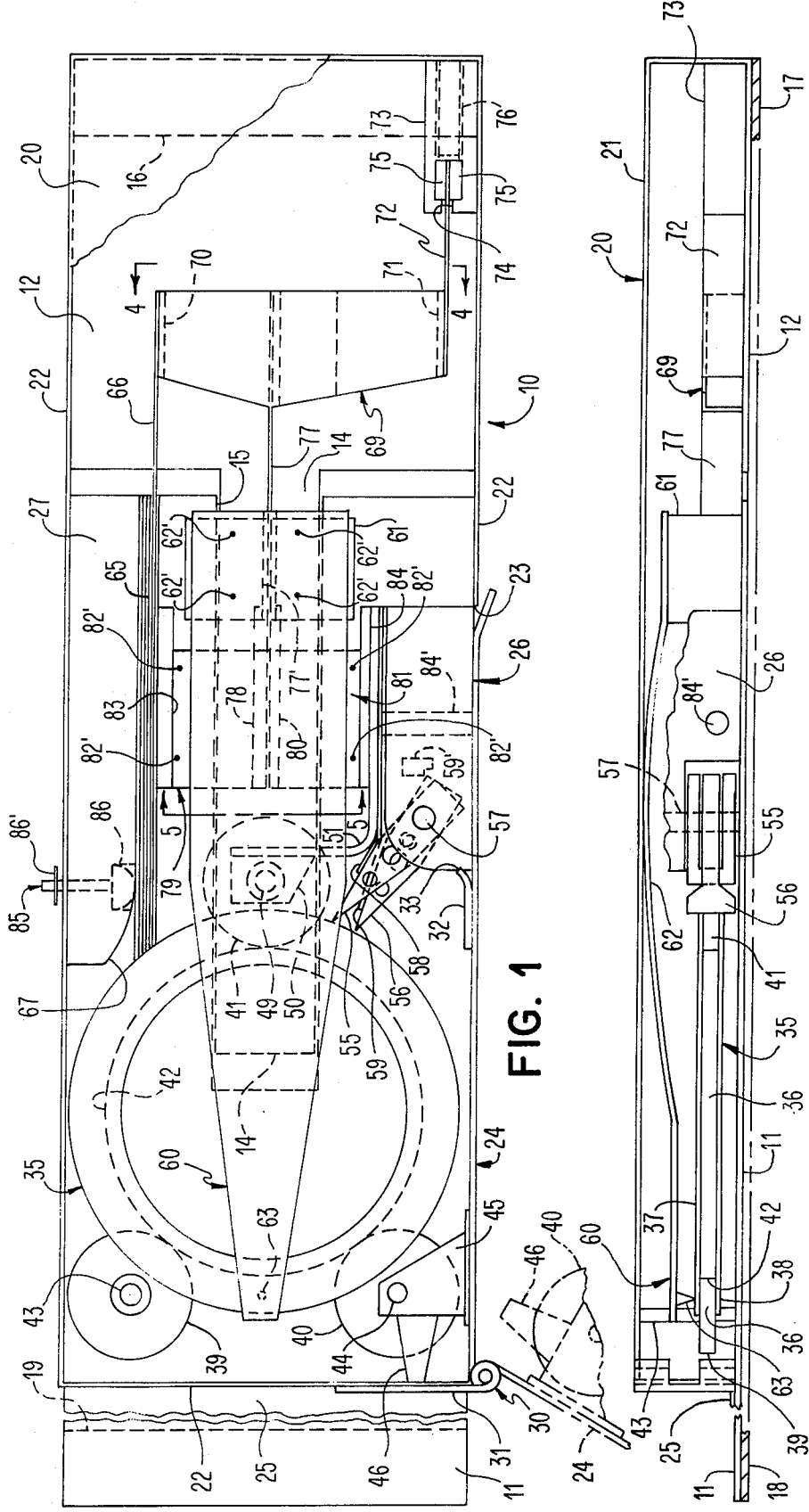

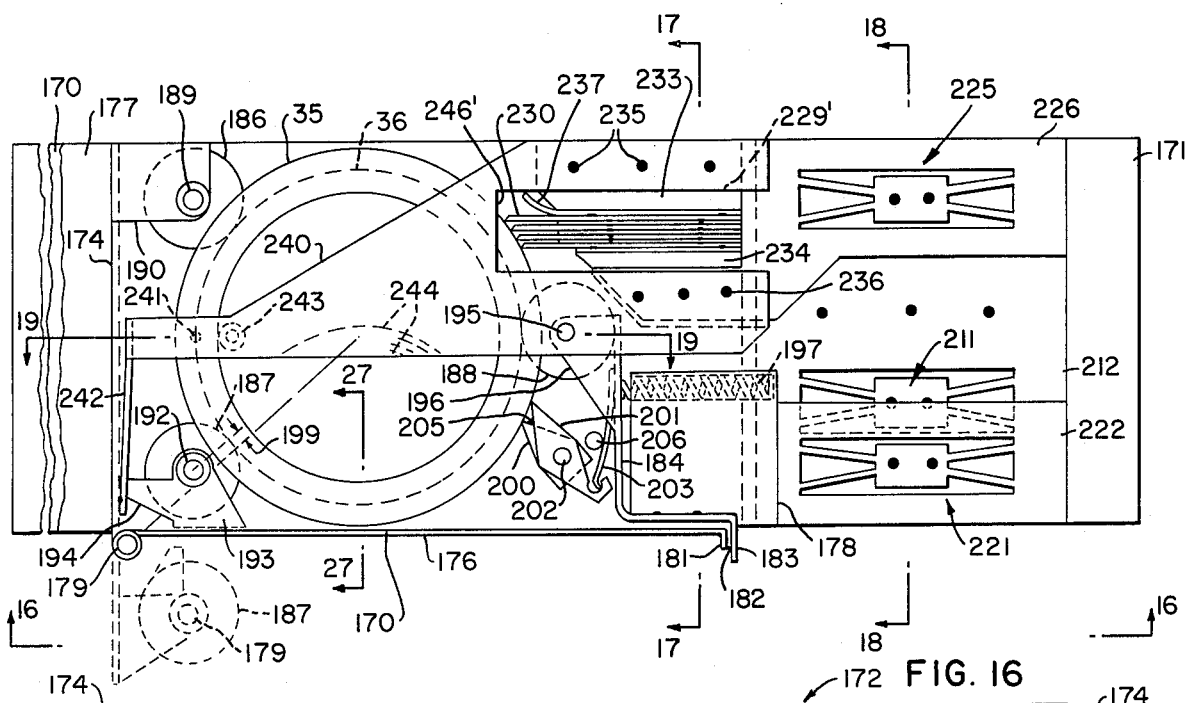
FIG. 15
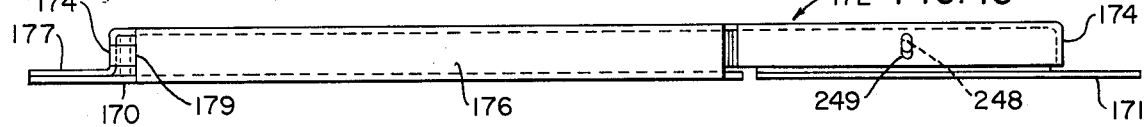
FIG. 16
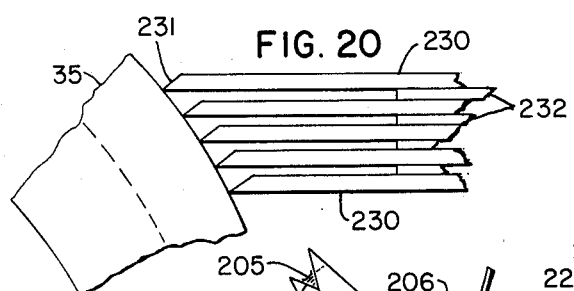
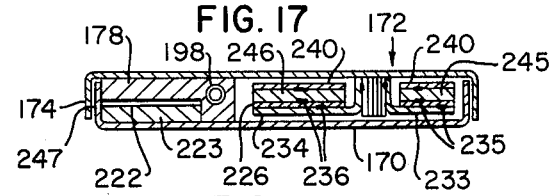
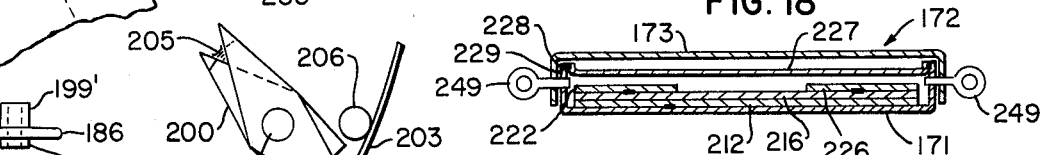
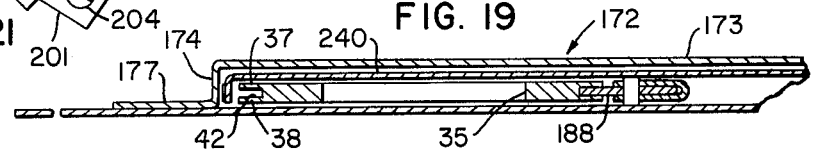
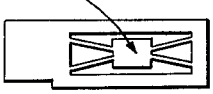
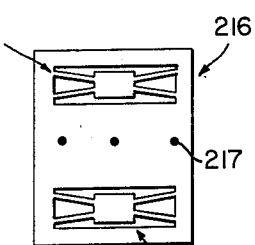

RECORDING INSTRUMENT

In U.S. Pat. No. 3,430,250 to Prewitt et al, there is shown a scratch strain recorder having a target with a groove in its periphery, the target supported by rollers engaging the flanges or side walls of the groove, and the target driven by wires engaging the bottom of the groove of the target. This support and drive arrangement of the aforesaid Prewitt et al patent reduced the motion frictions of the target in comparison with previously available scratch strain recorders.

While the support arrangement of the aforesaid Prewitt et al patent has been satisfactory, the present invention provides an arrangement in which the motion frictions of the target are reduced in comparison with those of the aforesaid Prewitt et al patent. This is accomplished through the target being supported by support elements engaging the bottom of the peripheral groove of the target. By supporting the target at the bottom of the peripheral groove, the support surface of the target is protected by the flanges or side walls of the groove of the target from any damage.

To properly support the target, its support rollers must have extremely low values of eccentricity between their running surfaces and their pivots. Any eccentricity causes the target to wobble and to cause associated errors in the data recorded on the target.

When supporting the target along the flanges or side walls of the groove as in the aforesaid Prewitt et al patent, it is extremely difficult to grind the mating surfaces of the rollers because the roller tongue, which fits into the target groove, is between the two mating surfaces. When the support roller engages the bottom of the target groove in the present invention, its mating surface is at the greatest radius from its pivot and it is easier to grind the mating surface into concentricity with its pivot so as to avoid any wobble produced by eccentricity.

Additionally, with the target supported at a smaller radius through being supported at the bottom of the groove and each of the support rollers having a greater radius since the support rollers extend to the bottom of the groove, the drag forces of the target support rollers of the present invention are reduced in comparison with the drag forces produced by supporting the target along the side walls of the target groove. Thus, by supporting the target at the bottom of the groove, the target of the present invention has less motion friction.

In the aforesaid Prewitt et al patent, the target was driven by flexible wires engaging the bottom of the target groove. The present invention is an improvement of the drive arrangement of the aforesaid Prewitt et al patent in that the periphery or rim of the target is engaged by the driving means, which are flat springs rather than wires, to cause the target to rotate a smaller angle for a given driver stroke. As a result, more events can be recorded on a target because of its slower turning speed.

Furthermore, the greater radius from the center of the target to its periphery or rim at which the driving means engages in comparison with the bottom of the peripheral groove being engaged by the driving means causes an increase in the torque applied to the target from the driving means of the present invention in comparison with the driving means of the aforesaid Prewitt et al patent. Thus, the present invention not only is able to provide a driving arrangement in which the target is capable of having more events recorded on a given area but it also applies a greater torque thereto.

In some situations, the wires of the aforesaid Prewitt et al patent could get out of the target and be permanently bent out of the driving position. Furthermore, because the wires were relatively limber, they could resonate at certain frequencies. Thus, in certain instances, the target of the aforesaid Prewitt et al patent was not driven as efficiently as desired.

The present invention provides an improved driving arrangement in which the foregoing problems of the aforesaid Prewitt et al patent are eliminated. Thus, the present invention utilizes flat springs rather than flexible wires as the driving means. Additionally, by utilizing the flat springs as the driving means rather than the wires, there is no possibility of the driving means entering the groove rather than engaging the rim or periphery of the target as is contemplated by the driving arrangement of the present invention.

The present invention also enables the target to be employed in areas having dust and drit without the target being exposed thereto. The present invention accomplishes this by utilizing a cover over the portions which would possibly fail to properly record the various strains if exposed to dust and dirt.

The use of a cover to prevent dust and dirt also prevents observation of the recordings on the target without removal of the target from within the cover or removal of the cover. The present invention avoids this through providing an arrangement in which portions of the target may be viewed without removing the target or the cover.

In the aforesaid Prewitt et al patent and U.S. Pat. No. 3,725,948 to Prewitt et al, the target had to be lifted up over one of the rollers when the target was inserted or removed. As a result, the design of the driver wires and the hold wires, which prevented reverse rotation, had to accommodate the relatively large target movement by the driver wires and the hold wires springing out of place.

The present invention eliminates this problem by mounting one of the supports for the target on a door, which cooperates with the cover to completely enclose the target. When the door is opened, the target support thereon springs away from the target to allow the target to be moved away from the remaining supports with the aid of the flat springs, which function as the driving means.

In each of the aforesaid Prewitt et al patents, reverse rotation of the target was prevented by the use of the hold wires being forced against the bottom of the groove. The required pressure of these wires caused considerable drag on the target to oppose forces produced by the driver wires. As a result, this cretaed another motion friction for the target.

The present invention reduces the drag on the target by utilizing relatively stiff members, which are resiliently biased into engagement with the periphery or rim of the target. This arrangement decreases the spring force required to maintain the point of contact with the target and correspondingly lowers the drag on the target.

Under certain conditions, it is desired to be able to compensate for temperature changes in the part to which the recorder is attached. The present invention satisfactorily solves this problem by providing for true temperature compensation through having interlocking portions of the adjacent base plates opposite each other whereby additional plates, which have the same coefficient of thermal expansion as the part having its strain measured, can be attached to the recorder base plates at the same longitudinal position.

This interlocking relationship between the base plates also simplifies mounting of the device to the part. The interlocking relation insures that the base plates remain in alignment with each other.

The present invention also contemplates transmitting the strains to the target so that the recorded strains can be amplified relative to the actual strain. The amplification arrangement enables relatively low strains to be recorded on a sufficient portion of the target to be observed.

The present invention utilizes a no play lever system to change the relationship between the actual strain and the recorded strain. This no play lever system permits various desired ratios of amplification.

The present invention also prevents recording of strains until a predetermined strain has occurred. This prevents any small motions, which it is not desired to record, from being recorded on the target whereby the target is more efficiently used. The present invention uses an adjustable play in the driver system to prevent advancement of the target until a predetermined strain exists.

The present invention also provides means for manually advancing the target by employing the driving means which advances the target in response to the strains. This manual target advance arrangement eliminates any false reading on the target.

An object of this invention is to provide an improved strain recorder.

Another object of this invention is to provide a strain recorder having a more positive drive for the target.

A further object of this invention is to provide a strain recorder having a target with less drag.

Still another object of this invention is to provide a strain recorder having an easier arrangement for inserting and mounting a target.

A still further object of this invention is to provide a strain recorder having an improved arrangement for preventing reverse rotation of a target with decreased drag on the target.

Yet another object of this invention is to provide a strain recorder having an arrangement for amplifying strains that drive the target and/or are recorded on the target.

A yet further object of this invention is to provide a strain recorder having an arrangement for preventing recordings on the target below a predetermined strain.

Still another object of this invention is to provide a strain recorder having a protective cover.

A still further object of this invention is to provide a strain recorder having true temperature compensation.

Yet still another object of this invention is to provide a no play lever system.

Other objects of this invention will be readily perceived from the following description, claims, and drawings.

This invention relates to an improvement in a recording instrument comprising first and second support means with marking means supported by the first support means. A target, which records motions in at least one of opposite senses by marks formed on the target due to movement of the marking means, is mounted on the second support means for movement relative thereto and has a groove in its periphery. Target moving means is adapted to engage the target to move the target intermittently in one direction in response to motions between the first and second support means. The target is removably mounted on the second support means. The improvement includes target support means supported by the second support means and engaging the bottom of the groove of the target to support the target.

This invention also relates to an improvement in a recording instrument comprising first and second support means with marking means supported by the first support means. A target, which records motions in at least one of opposite senses by marks formed on the target due to movement of the marking means, is mounted on the second support means for movement relative thereto. Target moving means is adapted to engage the target to move the target in one direction intermittently in response to motions between the first and second support means. The target is removably mounted on the second support means. The improvement includes target support means comprising a plurality of separate support members supported by the second support means and engaging the target to support the target. One of the support members is mounted by first means on the second support means for movement relative to the second support means from a position in which the one support member engages the target to a position in which the target may be removed from the second support means without engaging the one support member.

This invention further relates to an improvement in a recording instrument comprising first and second support means with marking means supported by the first support means. A target, which records motions in at least one of opposite senses by marks formed on the target due to movement of the marking means, is mounted on the second support means for movement relative thereto. Target moving means is adapted to engage the target to move the target in one direction intermittently in response to motions between the first and second support means. The target is removably mounted on the second support means. The improvement includes control means to control the movement of the target moving means in response to motions between the first and second support means to control the amount of movement of the target.

This invention still further relates to a recording instrument comprising first and second support means, marking means, and lever means pivotally connected to the first support means and to the marking means to pivotally connect the marking means to the first support means. A target, which records motions in at least one of opposite senses by marks formed on the target due to movement of the marking means, is mounted on the second support means for movement relative thereto. Target moving means is adapted to engage the target to move the target in one direction intermittently in response to motions between the first and second support means. The target is removably mounted on the second support means. The lever means includes fulcrum means secured to the second support means and pivotally connected to the lever means to change the amount of motion of the marking means in response to the magnitude of the motions.

This invention yet further relates to an improvement in a recording instrument comprising first and second support means with marking means supported by the first support means. A target, which records motions in at least one of opposite senses by marks formed on the target due to movement of the marking means, is mounted on the second support means for movement relative thereto. Target moving means is adapted to engage the target to move the target in one direction intermittently in response to motions between the first and second support means. The target is removably mounted on the second support means. The improvement includes first support means comprising a first plate for securing to one area of a workpiece to have its strain recorded and the second support means comprising a second plate for securing to another area of the workpiece and spaced from the one area. One of the first and second plates has a longitudinal slot in one end thereof and extending in the directions of the opposite senses and the other of the first and second plates has a tongue disposed in the slot in the one plate to align the first and second plates.

This invention still further relates to a pivot to pivotally connect two elements together including first means formed in one of the elements and second means formed in the other of the elements. Each of the first and second means includes a hub and a plurality of thin members extending from the hub with the hub and the thin members being defined by openings formed in each of the elements. The hubs of the first and second means are fixed to each other so that all motion is transmitted through the thin members of the first and second means to cause one of the elements to rotate in the opposite direction from the other of the elements about the hubs.

This invention yet still further relates to a recording instrument comprising first and second support means with marking means supported by the first support means. A target, which records motions in at least one of opposite senses by marks formed on the target due to movement of the marking means, is mounted on the second support means for movement relative thereto. Target moving means is adapted to engage the target to move the target intermittently in one direction in response to motions between the first and second support means. The target is removably mounted on the second support means. The target moving means includes a plurality of flat springs.

This invention also still further relates to a recording instrument comprising first and second support means with marking means supported by the first support means. A target, which records motions in at least one of opposite senses by marks formed on the target due to movement of the marking means, is mounted on the second support means for movement relative thereto. Target moving means is adapted to engage the target to move the target intermittently in one direction in response to motions between the first and second support means. The target is removably mounted on the second support means. Preventing means engages the target to prevent movement of the target in a direction opposite to the one direction. The preventing means includes at least one member, a pin supported by the first support means having the member pivotally mounted thereon, and means continuously urging the member to a position to remove any play of the member relative to the target and to cause the member to engage the target when the target is in its recording position.

This invention also relates to a recording instrument comprising first and second support means with marking means supported by the first support means. A target, which records motions in at least one of opposite senses by marks formed on the target due to movement of the marking means, is mounted on the second support means for movement relative thereto. Target moving means is adapted to engage the target to move the target intermittently in one direction in response to motions between the first and second support means. The second support means includes first and second plates disposed adjacent each other and secured to each other at one end. The second plate has its other end secured to a work area. The first plate, which has its other end supporting the target, is formed of at least one material and has a different coefficient of thermal expansion than the material of the second plate.

The attached drawings illustrate preferred embodiments of the invention, in which:

FIG. 1 is a top plan view of one form of the recording instrument of the present invention with most of the top plate of the cover removed for clarity purposes;

FIG. 3 is a side elevational view of the recorder of FIG. 1 with the door removed and showing the instrument mounted on a part that is to have its strains recorded by the instrument of the present invention;

FIG. 15 is a top plan view of still another embodiment of the recorder of the present invention;

FIG. 16 is a side elevational view of the recorder of FIG. 15 and taken along line 16—16 of FIG. 15;

FIG. 17 is a sectional view of a portion of the recorder of FIG. 15 and taken along line 17—17 of FIG. 15;

FIG. 18 is a sectional view of a portion of the recorder of FIG. 15 and taken along line 18—18 of FIG. 15;

FIG. 19 is a sectional view of a portion of the recorder of FIG. 15 and taken along line 19—19 of FIG. 15;

FIG. 20 is an enlarged fragmentary plan view showing the relationship of the driving elements with respect to the target for advancing the target;

FIG. 21 is an enlarged top plan view of means for preventing reverse rotation of the target of FIG. 15;

FIG. 22 is an elevational view of one of the rollers;

FIG. 23 is a top plan view of one of the plates used in the lever arrangement of FIG. 15;

FIG. 24 is a top plan view of another of the plates used in the lever arrangement of FIG. 15;

FIG. 25 is a top plan view of a further of the plates used in the lever arrangement of FIG. 15;

FIG. 26 is a top plan view of still another of the plates used in the lever arrangement of FIG. 15;

FIG. 27 is a fragmentary sectional view of a portion of the recorder of FIG. 15 and taken along line 27—27 of FIG. 15;

Figure 14:
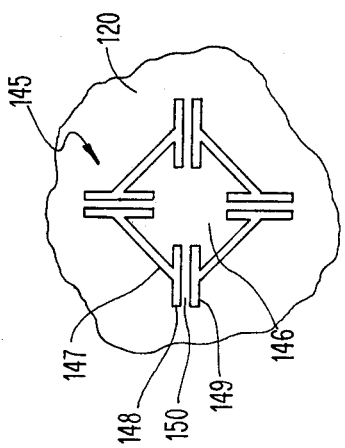
FIG. 14 is a fragmentary sectional view of another form of pivot used with the lever arrangement of the recorder of FIG. 7.

Referring to the drawings and particularly FIG. 1, there is shown a scratch strain gauge 10 of the present invention. The scratch strain gauge 10 has an elongated base plate 11 and an end base plate 12, which is spaced longitudinally from the base plate 11. Each of the base plates 11 and 12 is relatively thin and may be formed of any suitable material.

The end base plate 12 has a tongue 14 extending therefrom for disposition within a longitudinal slot 15 in the elongated base plate 11. This insures alignment of the two base plates 11 and 12 in the direction in which there is relative movement therebetween.

The end base plate 12 has a portion 16, which is furtherest from the elongated base plate 11, adapted to be secured to an area 17 (see FIG. 3) of a work or part that is to have its strains recorded by the scratch strain gauge of the present invention. The elongated base plate 11 is adapted to have any portion thereof attached to a second area 18 (see FIG. 3) of the same work or part. The two areas 17 and 18 are longitudinally spaced from each other.

The elongated base plate 11 is shown as having its end portion 19 (see FIG. 1) attached to the second area 18 (see FIG. 3). Since the centerline distance between the portions 16 and 19 represents the gauge length for a given installation on the work or part, changing of the location of the portion of the elongated base plate 11 attached to the second area 18 of the work or part changes the gauge length. The base plates 11 and 12 can be secured to the areas 18 and 17, respectively, by any suitable means such as adhesive bonding, clamps, rivets, or screws, for example.

A cover 20 is disposed over the end base plate 12 and portions of the elongated base plate 11 to provide protection from dust and dirt for the portions protected by the cover 20. The cover 20 includes a top plate 21 and downwardly depending skirts 22 (see FIG. 1) extending from each side and end of the plate 21. A portion of one of the skirts 22 is cut away to provide an opening 23, which is closed by a door 24.

The cover 20 is secured to the elongated base plate 11 by a lip 25, which can be spot welded, for example, to the elongated base plate 11, extending from one of the skirts 22. The cover 20 also has portions of the skirts 22 secured to blocks 26 and 27, which are secured to the elongated base plate 11 by suitable means such as spot welding, for example. The cover skirts 22 can be connected to the blocks 26 and 27 by spot welding, for example. The cover 20 also is secured to the elongated base plate 12 through having portions of the skirts 22 connected thereto by spot welding, for example.

The door 24 is pivotally mounted for movement between its closed position (solid line position of FIG. 1) and its open position (phantom line position of FIG. 1) by a hinge 30. The hinge 30 has a portion 31 fixed to the skirt 22 of the cover 20 from which the lip 25 extends. The door 24 is retained in its closed position by a latch 32 thereon cooperating with a retainer 33 on the block 26.

The elongated base plate 11 supports an annular member 35, which functions as the target of the scratch strain gauge of the present invention. The annular member 35 has a continuous groove 36 formed in its periphery to receive support means for rotatably mounting the annular member 35 on the base plate 11. The periphery or rim of the annular member 35 has an upper portion 37 above the groove 36 and a lower portion 38 below the groove 36 as shown in FIG. 3.

The support means for the annular member 35 can be rollers, for example. The support means can comprise three rollers 39, 40, and 41 with each of the rollers 39–41 engaging bottom 42 of the groove 36.

The roller 39 is rotatably mounted on a shaft 43, which has its lower end fixed to the elongated base plate 11 and its upper end fixed to the cover plate 21. The roller 40 is rotatably mounted on a shaft 44. The shaft 44 has its ends supported in vertically spaced portions of a bracket 45, which is fixed to the door 24. The bracket 45 carries a stop 46, which abuts the skirt 22 of the cover 20 from which the lip 25 extends when the door 24 is in its closed position. Thus, the roller 40 is supported against movement when the door 24 is in its closed position.

The roller 41 is rotatably mounted on a shaft 49, which has its end supported in vertically spaced portions of a bracket 50. The bracket 50 is mounted on a resilient support member 51, which is carried by the block 26 on the elongated base plate 11. Accordingly, the resilient member 51 continuously urges the roller 41 and the rollers 39 and 40 into engagement with the bottom 42 of the groove 36 in the annular member 35.

The annular member 35 can be easily inserted or removed from the support rollers 39–41. That is, when the door 24 is opened, the annular member 35 can be easily inserted since the roller 41 moves because of the resilient support member 51 to allow proper insertion of the annular member 35. Likewise, the opening of the door 24 removes the roller 40 from the position in which it would block insertion or removal of the annular member 35. (This open position of the door 24 is shown in phantom line position of FIG. 1 for one position of door opening.)

When the door 24 is closed, the roller 40 is located in an overcenter position relative to a line connecting the hinge 30 and the center of the annular member 35. This overcenter position of the roller 40 provides a small force, which tends to keep the door 24 latched and prevent movement of the roller 40 except for rotation about the shaft 44.

The annular member 35 is held against clockwise (as viewed in FIG. 1) rotation by retaining or holding means. The retaining or holding means preferably comprises a pair of stops 55 and 56, which are rotatably mounted on a shaft 57. The shaft 57 has its ends fixed to the block 26 and the elongated base plate 11 for support thereby.

The stop 55 is U-shaped when viewed from the side as in FIG. 3 and has a portion of the stop 56, which is T-shaped when viewed from the side as in FIG. 3, disposed therein between its legs. A spring 58 acts against the stop 55 and a spring 59 acts against the stop 56 to urge each of the stops 55 and 56 into engagement with both the upper portion 37 and the lower portion 38 of the periphery or rim of the annular member 35.

The motion of the stops 55 and 56 by the springs 58 and 59, respectively, is limited by a stop 59' on the block 26 being engaged by the stop 56. Any other suitable stop means such as a pair of set screws, for example, may be used in place of the stop 59'.

Both of the stops 55 and 56 are made to balance about the center of the shaft 57. This is accomplished to prevent vibrations and accelerations from causing the stops 55 and 56 from becoming disengaged from the periphery of the target 35. The balancing is accomplished by extending the stops 55 and 56 beyond the shaft 57 and by forming lightening holes in the opposite end of each of the stops 55 and 56.

The use of the two stops 55 and 56 insures that clockwise rotation of the annular member 35 is prevented even if a part of the periphery of the annular member 35 were to be damaged so that one of the stops 55 and 56 might not engage therewith to stop rotation. Spacing of the two stops 55 and 56 from each other when they engage the periphery of the annular member 35 insures that the reverse (clockwise) rotation does not occur.

The scratch means for forming the scratches on the upper surface of the annular member 35, which is the target, includes an arm 60 having one end fixed to a spacer plate 61, which is secured to the uoper surface of the tongue 14 of the end base plate 12 by suitable means such as spot welding at 62', for example. Thus, the arm 60 is held in spaced relation to the end base plate 12.

The arm 60 is disposed in substantially parallel relation with the plate 21 of the cover 20 except for a portion 62 of the arm being bent to engage the cover plate 21. This engagement of the portion 62 of the arm 60 with the plate 21 of the cover 20 provides for dampening and/or engaging force of a pointed element 63 on the scratch arm 60 with the annular member 35. The pointed element 63 is on the end of the arm 60 remote from the end base plate 12 and forms scratches on the upper surface of the annular member 35. The pointed element 63 extends downwardly from the lower surface of the arm 60, which overlies the annular member 35, and is urged downwardly against the annular member 35 due to the spring force of the arm 60 along with the contact of the portion 62 of the arm 60 with the plate 21 of the cover 20.

Accordingly, each time that there is relative motion between the areas 17 and 18 of the work, there is relative motion between the elongated base plate 11 and the end base plate 12 to cause the pointed element 63 on the arm 60 to form a scratch on the upper surface of the annular member 35. It should be understood that the material of the pointed element 63 must be harder than the material of the annular member 35 so that the pointed element 63 is capable of scratching the upper surface of the annular member 35.

The annular member 35 is rotated counterclockwise by driving means in response to relative motion in one direction between the base plates 11 and 12 due to strains produced between the areas 17 and 18. The driving means includes a plurality of separate driving members or elements 65. Each of the driving elements 65 preferably comprises a flat spring, which has a substantially rectangular cross section. At least one of the driving elements 65 has an extension 66 attached to the end base plate 12.

The elements 65 separately contact the upper portion 37 and the lower portion 38 of the periphery of the annular member 35 and, to this degree, act independently of each other. If desired, spacers may be disposed between the driving elements 65, which are secured to each other so as to be moved by the extension 66, to assure the independent operations. It should be understood that it is possible that some part of the upper portion 37 or the lower portion 38 of the periphery of the annular member 35 may be damaged so that each of the elements 65 does not contact both the upper portion 37 and the lower portion 38 of the periphery of the annular member 35.

Each of the driving elements 65 has its end, which engages the upper portion 37 and the lower portion 38 of the periphery of the annular member 35, formed at an acute angle to insure the desired contact with the upper portion 37 and the lower portion 38 of the periphery of the annular member 35. The driving elements 65 cause rotation of the annular member 35 when the base plates 11 and 12 move away from each other and the driving elements 65 are deflected against a curved surface 67 of the block 27 on the base plate 11. When the base plates 11 and 12 move towards each other, the driving elements 65 are deflected away from the annular member 35. It should be understood that the rotation of the annular member 35 could be produced when the base plates 11 and 12 move toward each other if desired.

Figure 6:
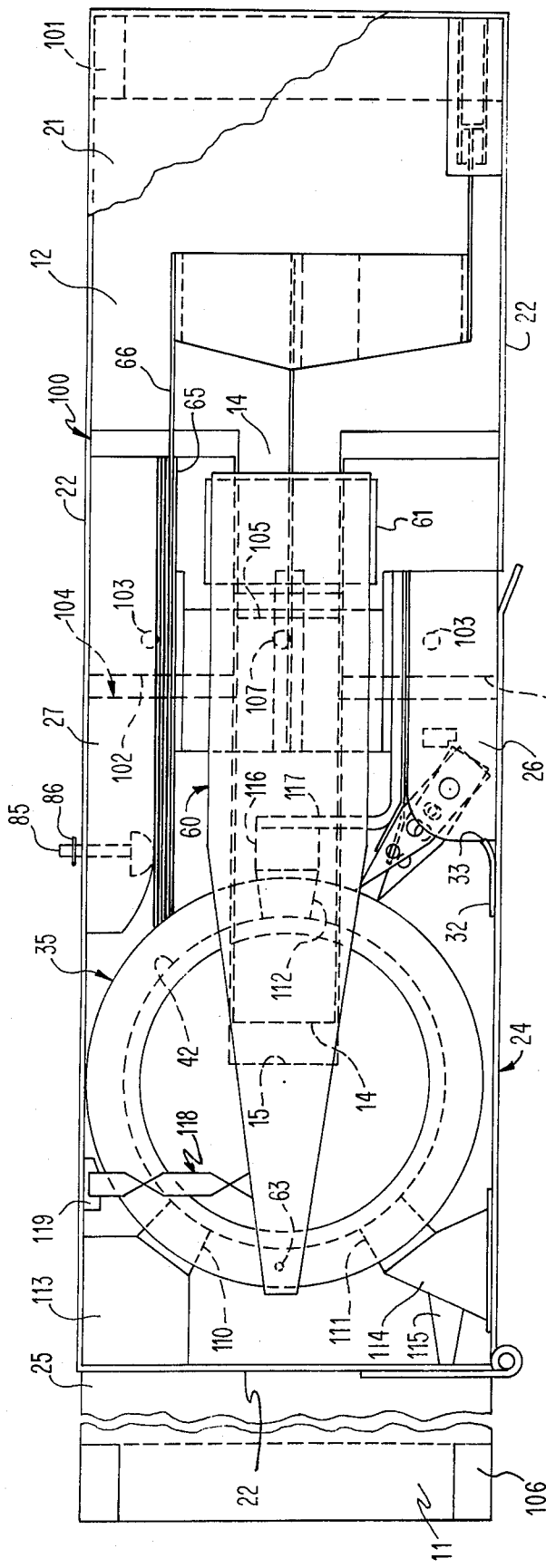
FIG. 6 is a top plan view of another embodiment of the recorder of the present invention utilizing a different support arrangement for the target.
Figure 12:
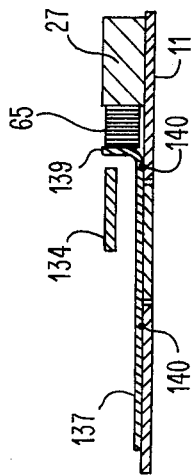
FIG. 12 is a sectional view showing the relationship of some of the plates of the lever arrangement of FIG. 7 and taken along line 12—12 of FIG. 7.
Figure 7:
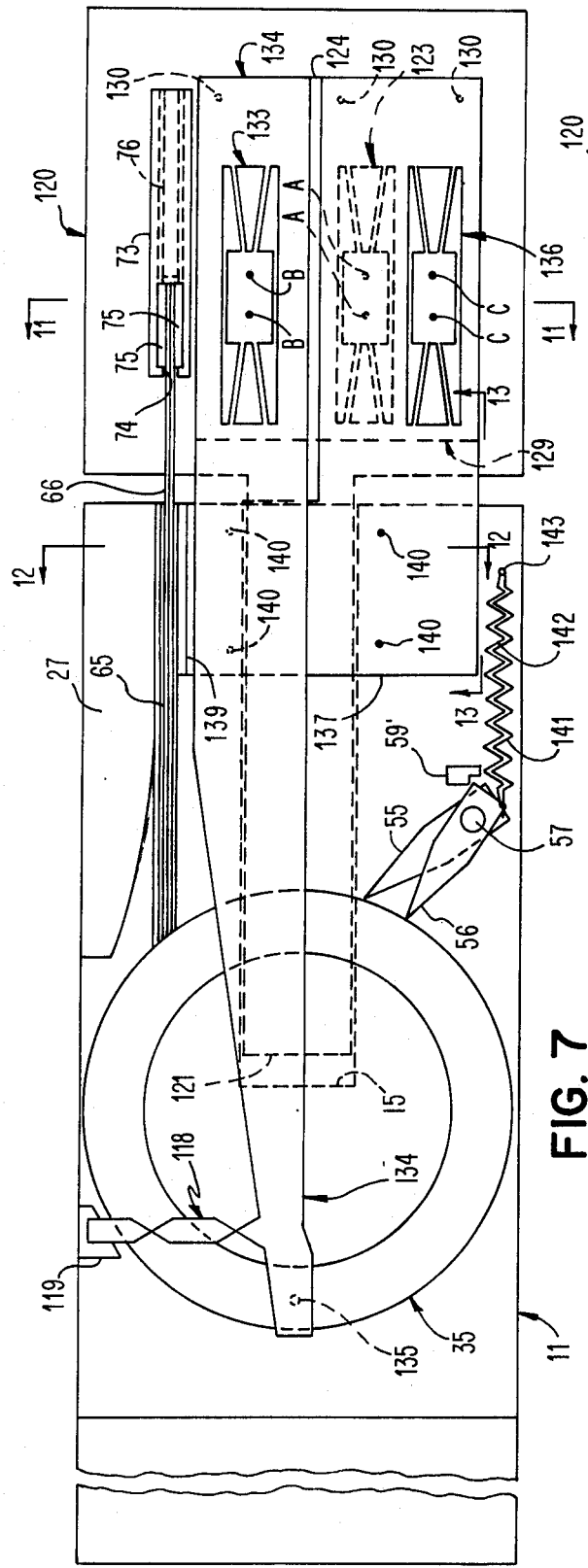
FIG. 7 is a top plan view of a further modification of the recorder of the present invention with the target support structure, the cover, and the door omitted.

The driving elements 65 are prebent or prestressed in a downward direction as viewed in FIGS. 1, 6, and 7. When the elements 65 are deflected by the relative motion between the base plates 11 and 12, the curved surface 67 of the block 27 on the base plate 11 limits the stress on each of the driving elements 65. This is a stress in the opposite direction to that in which the driving elements 65 have been prebent or prestressed.

The extension 66 of one of the driving elements 65 can be directly connected to the end base plate 12 for driving the annular member 35 or the extension 66 of the driving element 65 can be connected through a no play flexing lever system for changing the amount of advancement of the annular member 35 relative to the strain produced by the relative movement between the base plates 11 and 12. The lever system includes a walking beam 69 having the extension 66 of one of the driving elements 65 attached to a flange 70 on one end of the walking beam 69. The other end of the walking beam 69 has a flange 71 to which is attached a driving element 72, which can be a flat spring, for example. The driving element 72 can be connected to the end base plate 12 by any suitable means.

One suitable means of attaching the driving element 72 to the end base plate 12 includes a housing 73, which is fixed to the end base plate 12. The end of the driving element 72 extends through a slot 74 in the housing 73 and has a pair of plates 75 fastened to each side thereof with their ends flush with the end of the driving element 72.

An adjustable screw 76 is mounted in the housing 73. If the adjustable screw 76 is tight against the ends of the driving element 72 and the plates 75, there is no play therebetween so that all motions of the end base plate 12 are transmitted to the driving element 72. However, if the adjustable screw 76 is spaced slightly from the ends of the driving element 72 and the plates 75, there is some play, which is adjustable in accordance with the position of the adjustable screw 76, therebetween so that some movement of the end base plate 12 occurs relative to the elongated base plate 11 without any advancement of the annular member 35 by the driving elements 65. Thus, this arrangement prevents strains below a predetermined amount from being recorded whereby the annular member 35 lasts for a longer period of time.

Figure 5:
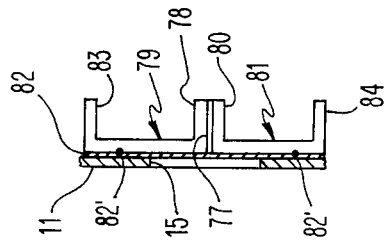
FIG. 5 is an elevational view, partly in section, of a portion of the motion transmitting means of FIG. 1 and taken along line 5—5 of FIG. 1.
Figure 4:
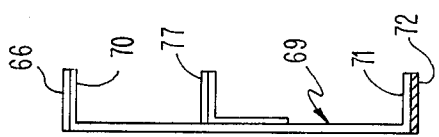
FIG. 4 is an end elevational view of a portion of the motion transmitting means of FIG. 1 and taken along line 4—4 of FIG. 1.

The walking beam 69 is connected to the elongate base plate 11 through a flexing walking arm support 77, which extends through an elongated opening or passage 77' in the spacer plate 61. The walking arm support 77 has one side secured to a flange 78 (see FIGS. 1 and 5) of a channel member 79 and its other side secured to a flange 80 of a channel member 81. The channel members 79 and 81, which are connected to each other by a thin plate 82, are fixed to the elongated base plate 11 on opposite sides of the elongated slot 15 by suitable means such as spot welding the thin plate 82 at 82' to the elongated base plate 11, for example.

The channel member 79 has a flange 83 to support one side of the driving elements 65. The channel member 81 has a second flange 84 to support one side of the springs 58 and 59 and the resilient member 51, which are urged against the second flange 84 by a set screw 84' extending through the block 26.

Accordingly, when the driving element 72 is moved by the movement of the end base plate 12 relative to the elongated base plate 11 due to a strain between the areas 17 and 18, the walking beam 69 deflects about the walking arm support 77 to cause the driving extension 66 to move in the opposite direction in accordance with the ratio of the distance between the extension 66 and the walking arm support 77 to the distance between the walking arm support 77 and the driving element 72. This ratio may be altered as desired through arranging the position of the walking arm support 77 relative to the longitudinal slot 15 in the elongated base plate 11. With the distance from the extension 66 to the walking arm support 77 being less than the distance from the walking arm support 77 to the driving element 72 as shown in FIG. 1, the driving elements 65 move a lesser distance than the recorded strain.

The block 27 has a manual advance knob 85 supported therein. The knob 85 has its enlarged end 86 engaged the driving elements 65 intermediate their ends to flex them when the knob 85 is pressed inwardly. The engagement of the end 86 of the knob 85 with the driving elements 65 causes them to deflect out of a straight line. When the driving elements 65 straighten up after the knob 85 is returned to its inactive position, the annular member 35 is rotated counterclockwise a very small distance whereby the annular member 35 is manually advanced. The knob 85 has a retainer 86' to limit its inward movement.

Figure 2:
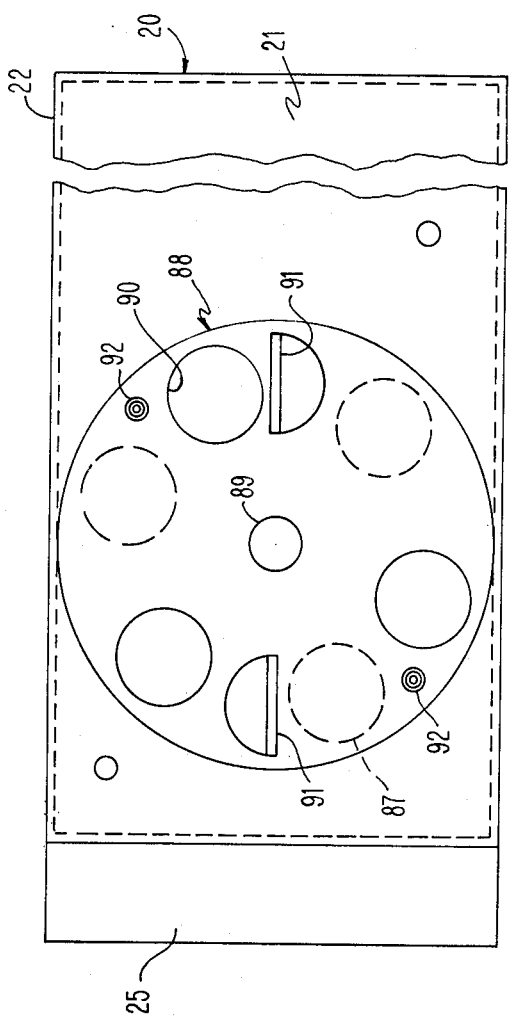
FIG. 2 is a top plan view of the cover.

To enable viewing of the annular member 35 without having to remove it, the plate 21 of the cover 20 has three openings 87 (see FIG. 2), which are preferably spaced 120° from each other so as to be equally angularly spaced from each other. The openings 87 are normally closed by portions of a disc cover 88, which is rotatably mounted on a shaft 89 extending upwardly from the plate 21 of the cover 20.

The disc cover 88 has three equally angularly spaced openings 90 formed therein for alignment with the openings 87 in the cover plate 21 to enable viewing of the three portions of the annular member 35 beneath the openings 87. Thus, the annular member 35 can have portions thereof examined without opening the door 24 or removing the annular member 35 from its support.

The disc cover 88 has a pair of upstanding projections 91 thereon to enable grasping thereof for rotation. The disc cover 88 is retained in the position shown in FIG. 2 in which the disc cover 88 closes the openings 87 in the cover plate 21 by any suitable means. One suitable means comprises a pair of diametrically disposed double detents 92 with each formed by cooperating dimples or depressions in the cover plate 21 and the disc cover 88.

Referring to FIG. 6, there is shown another form of the recording instrument of the present invention in which there is true temperature compensation. A temperature compensating base plate 100, which has the same coefficient of thermal expansion as the work or part having the areas 17 and 18, is disposed beneath the base plate 12 and attached thereto by bending tabs 101 over the sides of the end base plate 12 adjacent its end remote from the elongated base plate 100.

The base plate 100 has a pair of forks or fingers 102 extending beneath the bifurcated portions of the elongated base plate 11 on opposite sides of the longitudinal slot 15. Each of the forks 102 is secured to the corresponding bifurcated portion of the elongated base plate 11 by a rivet 103.

A temperature compensating base plate 104, which has a tongue 105 extending between the forks 102 in the base plate 100, is disposed beneath the elongated base plate 11. The temperature compensating base plate 104 has tabs 106 on the end remote from the tongue 105 for folding over the sides of the elongated base plate 11 to attach the temperature compensating base plate 104 to the elongated base plate 11. The temperature compensating base plate 104 is attached to the end base plate 12 through having a rivet 107, which is in alignment with the rivets 103 when in a neutral position so that a line joining the centers of the rivets 103 and 107 is perpendicular to the direction of relative movement between the base plates 11 and 12, connect the tongue 105 to the tongue 14 of the end base plate 12.

The temperature compensatng base plate 104 is connected to the second area 18 of the work or part rather than the elongated base plate 11 being connected thereto. Similarly, the temperature compensating base plate 100 is connected to the first area 17 of the work or part rather than the end base plate 12. Each of the temperature compensating base plates 100 and 104 is formed with the same coefficient of thermal expansion as the work or part having its strain recorded so that true temperature compensation occurs.

If desired, the temperature compensating base plates 100 and 104 could have the same configuration as the end base plate 12 and the elongated base plate 11, respectively. When the temperature compensating base plates 100 and 104 have the same configuration as the end base plate 12 and the elongated base plate 11, respectively, they still must be connected to the corresponding base plates 12 and 11 on the line containing the rivets 103 and 107 so that the line joining the centers of the rivets 103 and 107 is straight. This line is normally perpendicular to the direction of relative movement between the base plates 11 and 12 when in a neutral position. This insures that there is true compensation for any temperature change of the part in the recordings made by the arm 60 on the annular member 35.

Instead of mounting the annular member 35 on the rollers 39, 40, and 41 as shown in FIG. 1, the annular member 35 could be supported by sliding members 110, 111, and 112, which are spaced from each other in the same manner as the rollers 39, 40, and 41. The sliding member 110 is supported by a bracket 113, which is secured to at least one of the elongated base plate 11 and the plate 21 of the cover 20. The sliding member 111 is secured to the door 24 through a bracket 114, which is fixed to the door 24. Because of the shape of the bracket 114, a stop 115 is utilized in conjunction with the bracket 114 rather than the stop 46. The stop 115 is secured to the bracket 114 of the door 24 in the same manner as the stop 46.

The sliding member 112 is secured through a bracket 116 to a resilient member 117, which functions in the same manner as the resilient member 51. That is, the resilient member 117 urges the sliding member 112 into engagement with the bottom 42 of the groove 36 in the annular member 35.

The resilient member 117 may be adjusted through bending it to provide any desired force against the annular member 35 through the sliding member 112. This enables the recording instrument to operate in a vibratory environment without any false movement.

The sliding members 110-112 may be formed of any suitable material having a low sliding friction. One suitable example of the material is Teflon.

If desired, the arm 60 may have a double twisted strap 118 secured thereto adjacent the pointed element 63. The other end of the strap 118 is connected to a bracket 119, which is secured to the base plate 11 or the cover 20. By twisting the strap 118 180° in two separated locations between the attachment of the strap 118 to the arm 60 and its connection to the bracket 119, longitudinal movement of the pointed element 63 is permitted without any appreciable restraint. However, the strap 118 prevents lateral movement of the arm 60 and the pointed element 63.

Referring to FIG. 7, there is shown another form of the recording instrument of the present invention in which the strain motion is amplified before the pointed element 63 marks the annular member 35. While the height of the trace on the annular member 35 by the pointed element 63 is normally directly proportional to the gauge length of the recording instrument, the amplification of the motion of the pointed element 63 by this embodiment of the present invention enables reduction of this gauge length and is particularly useful where the mounting space for the recording instrument is limited.

Figure 10:
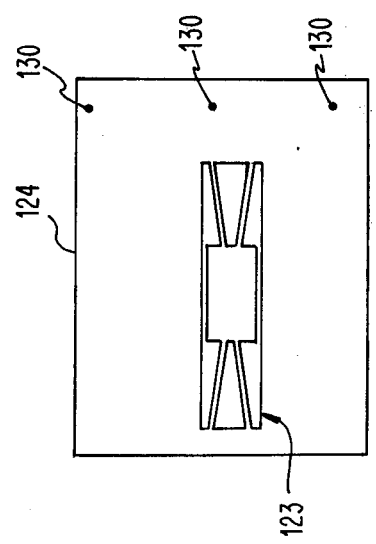
FIG. 10 is a top plan view of yet another of the plates used in the lever arrangement of the recorder of FIG. 7.

The end base plate 12 is replaced by an end base plate 120, which has a tongue 121 in the same manner as the base plate 12 has the tongue 14. The end base plate 120 has an elongated wheel pivot 122 (see FIG. 8) formed therein for cooperation with an elongated wheel pivot 123 on a plate 124 (see FIG. 10), which is disposed above the end base plate 120.

Figure 8:
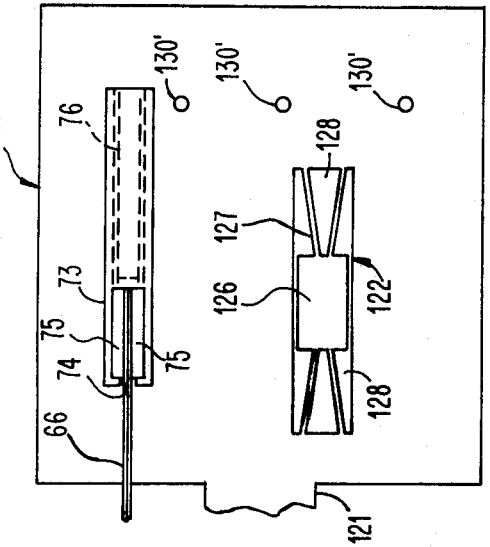
FIG. 8 is a top plan view of one of the plates used in the lever arrangement of the recorder of FIG. 7.

Each of the wheel pivots 122 and 123 comprises a hub 126 and spokes 127 extending outwardly from the hub 126. As shown in FIG. 8 for the wheel pivot 122 on the plate 120, the spokes 127 are formed through blanked out apertures 128 in the plate 120. All of the wheel pivots, which will be hereinafter described for this embodiment, are formed in the same manner.

Figure 11:
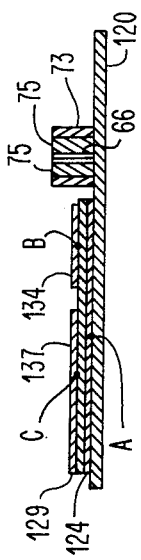
FIG. 11 is a sectional view showing the relationship of the pivots and the plates of FIG. 7 and taken along line 11—11 of FIG. 7.

The hubs 126 of the wheel pivots 122 and 123 are spot welded to each other as indicated at A in FIGS. 7 and 11, and this is the only connection between the plates 120 and 124. As a result, when one of the plates 120 and 124 is moved rotationally about the hubs 126 relative to the other, the spokes 127 of the wheel pivots 122 and 123 are deflected with respect to each other so that rotation of one of the wheel pivots 122 and 123 in one direction results in the other of the wheel pivots 122 and 123 rotating in the opposite direction. This is a very limited amount of rotation.

A plate 129 (see FIG. 9) is disposed above the plate 124 and is spot welded thereto as indicated at 130. This is the only connection between the plates 124 and 129. The end base plate 120 has clearance holes 130' therein to permit this spot welding of the plates 124 and 129 to each other without including the end base plate 120.

Figure 9:
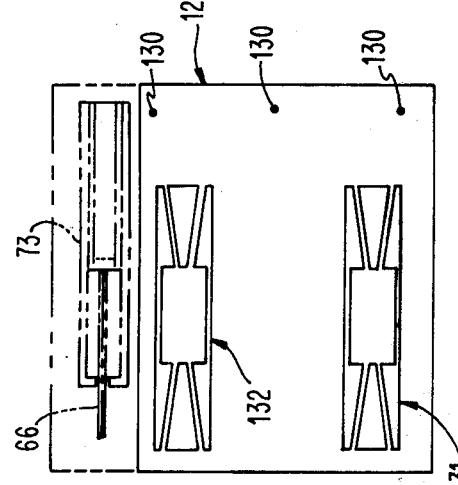
FIG. 9 is a top plan view of another of the plates used in the lever arrangement of the recorder of FIG. 7.

The plate 129 has two elongated wheel pivots 131 and 132 as shown in FIG. 9. The wheel pivot 132 cooperates with an elongated wheel pivot 133 (see FIG. 7) on an arm 134, which replaces the arm 60. The arm 134 has a pointed element 135, which is like the pointed element 63 on the arm 60, for marking the annular member 35. The hubs 126 of the wheel pivots 132 and 133 are spot welded to each other as indicated at B in FIGS. 7 and 11.

Figure 13:
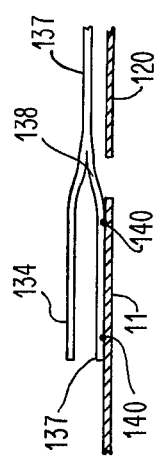
FIG. 13 is a fragmentary elevational view, partly in section, of a portion of the recorder of FIG. 7 showing the relationship of some of the plates of the lever arrangement of FIG. 7 and taken along line 13—13 of FIG. 7.

The plate 129 has the wheel pivot 131 cooperating with an elongated wheel pivot 136 of a support plate 137. The hubs 126 of the wheel pivots 131 and 136 are spot welded together, as indicated at C in FIGS. 7 and 11, prior to assembling the plates 124 and 129 in the same manner as the hubs 126 of the wheel pivots 122 and 123 are attached to each other. The support plate 137 is offset down starting at 138 (see FIG. 13) so that the support plate 137 will be on a level just above the base plate 11. The support plate 137 has a bent up flange 139 for cooperation in guiding the driver elements 65.

The support plate 137 is secured to the base plate 11 in a plurality of positions as indicated at 140 by suitable means such as spot welding, for example. Thus, the wheel pivots 131,136 function as a fulcrum for the lever relation between the wheel pivots 122,123 and the wheel pivots 132,133. This causes any input in one direction at th wheel pivots 122,123 to be an output in the same direction at the wheel pivots 132,133.

Accordingly, with the plate 124 secured to the plate 129 and the support plate 137 secured to the upper plate 129, the wheel pivots 122,123 are disposed intermediate the wheel pivots 131,136 and the wheel pivots 132,133 as shown in FIG. 7. The ratio of the distance from the center of the hubs 126 of the wheel pivots 131,136 to the center of the hubs 126 of the wheel pivots 132,133 with respect to the distance from the center of the hubs 126 of the wheel pivots 122, 123 to the center of the hubs 126 of the wheel pivots 131, 136 determines the amplification of the motion. Thus, the amount of movement of the arm 134 is greater than the amount of movement between the base plates 11 and 120 to amplify the sensed strains recorded on the annular member 35.

As illustrated, the driver motion is not amplified. However, when it is desired to amplify the driver motion to a greater extent than that for the recording motions, the plate 129 is extended up to have the same width as the plate 120 as indicated in phantom lines in FIG. 9. With this arrangement, the housing 73 is fixed to this extended portion of the plate 129 rather than to the plate 120.

In this arrangement, the housing 73 moves about the pivots 131,136 when activated by movement of the plate 120 at the pivots 122,123. This increase in movement of the extensions 66 of the driving elements 65 relative to the movement between the base plates 11 and 120 is the relationship of the distance between the center of the extensions 66 of the driving elements 65 and the pivots 131,136 as related to the distance between the pivots 122,123 and the pivots 131,136.

The mounting of the housing 73 on the extended portion of the plate 129 requires that the lower portion of the extensions 66 of the driving elements 65 and the housing 73 be removed. This is necessary because of the portion of the housing 73 on top of the plate 129 rather than on top of the base plate 120.

Since the plates 124 and 129 are very thin such as approximately 0.015 inches thick, for example, the portion removed from the extensions 66 of the driving elements 65 and the housing 73 is relatively unimportant. It is only necessary that the removal be such that the driving elements 65 rest against the upper surface of the base plate 11.

The direction of motion of the driver elements 65 is the same as the arm 134. Each of a plurality of the driver elements 65 has its extension 66 secured to the base plate 120 to transmit motion to the driver elements 65. All of the driver elements 65 are secured to each other in the same manner as described with respect to FIG. 1.

The extensions 66 of the driver elements 65 are secured to the base plate 120 in the same manner as the driving element 72 is secured to the base plate 12 in FIG. 1. Thus, the adjustable play, which is produced by the adjustable screw 76, is employed.

Instead of using the springs 58 and 59 with the stops 55 and 56, coil springs 141 and 142 are employed with the stops 55 and 56, respectively. The springs 141 and 142 are secured to the stops 55 and 56, respectively, and also secured to a support pin 143 on the base plate 11.

It is not necessary to use the block 26 in this arrangement as long as the shaft 57 has its ends supported in the base plate 11 and the cover plate 21. When not using the block 26, the retainer 33 must be supported on the base plate 11 for cooperation with the latch 32 on the door 24, and the stop 59' also must be supported on the base plate 11 for cooperation with the stop 56.

The forces of the springs 141 and 142 along with the forces applied to the stops 55 and 56 at their engagement with the annular member 35 cause each of the stops 55 and 56 to move away from the annular member 35 in a manner to close the gap between the inner surface of the hole for the shaft 57 in each of the stops 55 and 56 and the shaft 57 on the side nearest to the annular member 35. Thus, there is no play between the stop 55 or 56 and the shaft 57. The force of the springs 141 and 142 pull the stops 55 and 56 in the general direction of the clockwise load produced on the stops 55 and 56 by the annular member 35 when the driving elements 65 are retracted from the annular member 35.

Referring to FIG. 14, there is shown a wheel pivot 145 in the end plate 120 rather than the wheel pivot 122. The wheel pivot 123 is similarly formed. All of the other wheel pivots 131, 132, 133, and 136 could be similarly formed if desired.

The wheel pivot 145 has a quad keystone shaped hub 146 formed by thin longitudinal openings 147 having openings 148 and 149 at each end thereof. Between the opening 148 at one end of one of the longitudinal openings 147 and the opening 149 at one end of an adjacent of the longitudinal openings 147, a thin strip 150 of the base plate 120 is disposed. Thus, the hubs 146 can be spot welded to each other with the strips 150 functioning as the spokes that cooperate with each other in the same manner as the spokes 127 of the wheel pivots 122 and 123, for example.

While the wheel pivots have been shown as utilized for transmitting motion to the arm 134, it should be understood that the wheel pivots may be readily employed wherever it is desired to transmit slight rotary motion between elements relatively close to each other.

Referring to FIGS. 15-27, there is shown another form of the recording instrument of the present invention in which there is amplification of both the strain motions and driving motions. The recording instrument includes an elongated base plate 170, which replaces the base plate 11, and an end base plate 171, which is spaced longitudinally from the base plate 170. The base plates 170 and 171 are secured to two longitudinally spaced areas of the same work or part that is to have its strains recorded by the scratch strain gauge. The plates 170 and 171 are secured to the areas by any suitable means in the same manner as the base plates 11 and 12.

A cover 172 is disposed over portions of the base plates 170 and 171 to provide protection from dust and dirt for the portions protected by the cover 172. The cover 172 includes a top plate 173 and downwardly depending skirts 174 extending from each side and end of the plate 173. A portion of one of the skirts 174 is cut away to provide an opening, which is closed by a door 176.

The cover 172 is secured to the elongated base plate 170 by a lip 177, which can be spot welded, for example, to the elongated base plate 170, extending from one of the skirts 174. The cover 172 is secured to a block 178, which is secured to the elongated base plate 170 by suitable means such as spot welding, for example. The cover plate 173 can be connected to the block 178 by spot welding, for example. The cover 172 is not secured to the end base plate 171 so that there is freedom of movement between the cover 172 and the end base plate 171.

The door 176 is pivotally connected for movement between its closed position (solid line position of FIG. 15) and its open position by a hinge 179. The hinge 179 has a portion fixed to the skirt 174 of the cover 172 from which the lip 177 extends. The door 176 is retained in its closed position by a bent out section 181 extending just under a bulge 182 on an extension 183 of a spring 184, which is secured to the block 178 by suitable means such as spot welding, for example.

The elongated base plate 170 supports the annular member 35 by rollers 186, 187, and 188. Each of the rollers 186-188 engages the bottom 42 of the groove 36 in the annular member 35 in the same manner as described with respect to FIG. 1.

The roller 186 is rotatably mounted on a shaft 189, which has its lower end fixed to the elongated base plate 170 and its upper end fixed to a bracket 190. The bracket 190 is supported by the skirt 174 of the cover 172 from which the lip 177 extends.

The roller 187 is rotatably mounted on a shaft 192. The shaft 192 has its ends supported in vertically spaced portions of a bracket 193, which is fixed to the door 176. The bracket 193 carries a stop 194, which abuts the skirt 174 of the cover 172 from which the lip 177 extends when the door 176 is in its closed position. Thus, the roller 187 is supported against movement when the door 176 is in its closed position.

The roller 188 is rotatably mounted on the shaft 195, which has its ends supported in vertically spaced portions of a bracket 196. The bracket 196 is mounted on the end of the spring 184 remote from the extension 183.

The roller 188 is continuously urged into engagement with the bottom 42 of the groove 36 in the annular member 35 by the spring 184 and a coil spring 197, which is disposed within a recess 198 (see FIG. 17) in the block 178. The spring 197 assists in producing the desired force of the roller 188 against the bottom 42 of the groove 36 in the annular member 35.

The annular member 35 is easily inserted or removed from the support rollers 186–188. That is, when the door 176 is open, the annular member 35 can be easily inserted since the roller 188 moves because of the springs 184 and 197 to allow proper insertion of the annular member 35. Likewise, the opening of the door 176 removes the roller 187 from the position in which it would block insertion or removal of the annular member 35. A partial opening of the door 176 is shown in phantom line position in FIG. 15.

When the door 176 is closed, the roller 187 is located in an overcenter position relative to a line connecting the hinge 179 and the center of the annular member 35. This offset is indicated at 199 in FIG. 15. This overcenter position of the roller 187 provides a small force, which tends to keep the door 176 latched and prevent movement of the roller 187 except for rotation about the shaft 192.

As shown in FIG. 22 for the roller 186, each of the rollers 186 and 187 has a short hub 198' extending therebeneath and a long hub 199' extending thereabove. For the roller 188, both of these hubs are reduced until they are a minimum to permit fitting the roller 188 into the bracket 196.

The annular member 35 is held against clockwise (as viewed in FIG. 15) rotation by retaining or holding means. The retaining or holding means preferably comprises a pair of stops 200 and 201, which are rotatably mounted on a shaft 202. The shaft 202 has its ends fixed to the elongated base plate 170 and the cover plates 173 for support thereby.

A spring 203, which has one end fixed to the spring 184 by suitable means such as spot welding, for example, has its other end disposed in a recess 204 in the stop 201. As a result, the spring 203 exerts a force tending to keep the end of the stop 201 in engagement with both the upper portion 37 and the lower portion 38 of the periphery or rim of the annular member 35. A spring member 205 is disposed between the stops 200 and 201 to produce a force on the stop 200 tending to maintain it in contact with both the upper portion 37 and the lower portion 38 of the periphery or rim of the annular member 35.

The motion of the stops 200 and 201 by the spring 203 and the spring member 205, respectively, is limited by a stop 206, which extends upwardly from the elongated base plate 170, being engaged by the stop 200. Any other suitable stop means may be utilized.

The force of the spring 203 urges the stop 201 agains the shaft 202 and the annular member 35 in such a manner that play between the shaft 202 and the stop 201 is removed for operating conditions. The spring member 205 tends to move the stop 200 counterclockwise. This also tends to remove any play of the stop 200 with respect to the shaft 202.

Both the advancement of the annular member 35 and the marking thereof are accomplished through a no play lever system. The no play lever system amplifies bot the marking motions and the driving motions for rotating the annular member 35.

The no play lever system includes an elongate pivot 210 (see FIG. 23) formed in the end base plate 171 for cooperation with an enlarged pivot 211 in plate 212 (see FIG. 24). The plate 212 is disposed above the end base plate 171 as shown in FIG. 18.

Each of the elongatd pivots 210 and 211 comprises a hub 213 and spokes 214 extending outwardly from the hub 213. As shown in FIG. 23 for the elongated pivot 210 on the end base plate 171, the spokes 214 are formed through making apertures 215 in the end base plate 171. All of the elongated pivots, which will be hereinafter described for this embodiment, are formed in the same manner.

The hubs 213 of the pivots 210 and 211 are spot welded to each other, and this is the only connection between the end base plate 171 and the plate 212. As a result, when the end base plate 171 and the plate 212 move rotationally about the hubs 213 relative to each other to accommodate angular movement of the plate 212, the spokes 214 of the pivots 210 and 211 are deflected with respect to each other so that rotation of one of the pivots 210 and 211 in one direction results in the other of the pivots 210 and 211 rotating in the opposite direction. This is a very limited amount of rotation.

A plate 216 (see FIG. 25) is disposed above the plate 212 and is spot welded thereto at 217. The end base plate 171 has clearance holds 218 therein to permit this spot welding of the plates 212 and 216 to each other without including the end base plate 171.

The plate 216 has a pair of elongated pivots 219 and 220 formed therein. The pivot 219 cooperates with an elongated pivot 221 (see FIG. 26) in a support plate 222. The support plate 222 has its end supported between the block 178 and a block 232 (see FIG. 17). The block 223 is secured to the elongated base plate 170 by suitable means such as welding, for example.

The hubs 213 of the pivots 219 and 221 are spot welded to each other. This forms the only connection between the plate 216 and the support plates 222.

The pivot 220 in the plate 216 cooperates with a pivot 225 (see FIG. 15) in an arm 226. The hubs 213 of the pivots 220 and 225 are spot welded to each other to form the only connection between the plate 216 and the arm 226. As shown in FIG. 18, the support plate 222 and the arm 226 are disposed in the same horizontal plane.

A bulkhead 227 is mounted just above the support plate 222 and the arm 226 to maintain the desired assembly of the plates 212 and 216, the support plate 222, and the arm 226 flat on the end base plate 171. The bulkhead 227 is secured by suitable means such as spot welding, as indicated at 228, to bent up sides 229 of the end base plate 171.

Accordingly, any longitudinal motion of the end base plate 171 causes the pivot 220 of the plate 216 to move in proportion to the relationship of the ratio of the distance between the hubs 213 of the pivots 219 and 221 and the hubs of the pivots 220 and 225 to the distance between the hubs 213 of the pivots 219 and 221 and the hubs 213 of the pivots 210 and 211. This produces the desired amplification due to the relative motion between the spaced areas of the work to which the elongated base plate 170 and the end base plate 171 are secured.

The arm 226 has a cut out portion 229' therein to accommodate driving means secured thereto for rotating the annular member 35 counterclockwise (as viewed in FIG. 15). The driving means includes a plurality of separate driving members or elements 230. Each of the driving elements 230 preferably comprises a flat spring having a beveled edge 231 as shown in FIG. 20. The driving elements 230 are individually separated by spacers 232 to insure individual contact of each of the driving elements 230 with the annular member 35 when they are moved in response to relative motion between the end base plate 171 and the elongated base plate 170.

The driving elements 230 and the spacers 232 are supported between mounting plates 233 and 234. The driving elements 230 and the spacers 232 are secured to each other by spot welding, for example. Similarly, the mounting plates 233 and 234 are secured to the driving elements 230 and the spacers 232 by spot welding, for example. (see FIG. 17)

The mounting plate 233 is secured to the arm 226 by spot welding as indicated at 235. Similarly, the mounting plate 234 is connected to the arm 226 by spot welding as indicated at 236.

Accordingly, the driving elements 230 are supported on the arm 226. Thus, whenever the arm 226 is moved due to relative motion between the end base plate 171 and the elongated base plate 170, there is movement in one of the directions by the driving elements 230. Thus, if the end base plate 171 has relative movement toward the elongated base plate 170, the driving elements 230 are moved a greater distance towards the annular member 35 to advance the annular member 35 counterclockwise (as viewed in FIG. 15).

The driving elements 230 are permanently bent counterclockwise (as viewed in FIG. 15) so that they will drive the annular member 35 when extended from the position shown in FIGS. 15 and 20. When the end base plate 171 moves closer to the elongated base plate 170 because of a compression in the work to which they are attached, the driving elements 230 deflect upwardly. Conversely, when the end base plate 171 moves away from the elongated base plate 170, the driving elements 230 deflect downwardly.

The mounting plate 233 has an extended portion 237 (see FIG. 15) with a radius. This limits the radius of curvature of the driving elements 230 below their elastic limit when driving the annular member 35.

The arm 226 has an arm 240, which has a pointed element 241 thereon for scratching the annular member 35 in the same manner as the pointed element 63 of the scratch arm 60 does, connected thereto. The arm 240 has a lateral support arm 242 at its end.

The lateral support arm 242 has its free end attached to the skirt 174 of the cover 172 from which the lip 177 extends. The free end of the lateral support arm 242 is secured to the skirt 174 by suitable means such as welding, for example.

The arm 240 has a detent or projection 243 extending downwardly therefrom for a slightly greater distance than the pointed element 241. As a result, when the annular member 35 is inserted, the detent or projection 243 rides on the upper surface or face of the annular member 35 to lift the pointed element 241 above the face of the annular member 35. When the detent or projection 243 drops into the cut out center portion of the annular member 35, the pointed element 241 engages the face of the annular member 35. This small vertical motion of the arm 240 is permitted by flexing of the arm 240 between the detent or projection 243 and the lateral support arm 242.

The arm 240 has a bent up section 244. This insures that the annular member 35 does not engage the forward edge of the arm 240 when the annular member 35 is inserted.

It should be understood that the arm 240 is lifted to just beneath the cover plate 173 by spacer blocks 245 and 246. The spacer blocks 245 and 246 are secured as by spot welding to fingers of the arms 226 and 240. The fingers of the arm 226 define the cut out portion 229' and the fingers of the arm 240 define a corresponding cut out portion 246'.

To aid in preventing dirt and dust from entering the scratch strain gauge, the elongated base plate 170 has its sides 247 (see FIG. 17) bent upwardly so as to have the skirts 174 of the cover 172 overlap.

The overlapping arrangement of the skirts 174 of the cover 172 with the bent up sides 229 of the end base plate 171 enables the initial distance between the plates 170 and 171 to be fixed. The sides 229 of the end base plate 171 and the skirts 174 of the cover 172 have aligned holes or openings 248 to receive pins 249. After the recording instrument of the present invention is mounted on the work, the pins 249 are removed, and the holes 248 in the skirts 174 of the cover 172 are plugged to exclude dirt and dust.

If desired, the door 176 can have a flange 250 (see FIG. 27) mounted thereon to stiffen the door 176. As a result, there is an overlap of the flange 250 of the door 176 with the top cover plate 173 of the cover 172 to aid in excluding dirt and dust.

Figure 28:
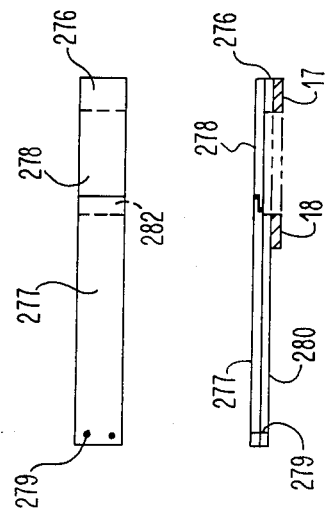
FIG. 28 is a schematic top plan view of an arrangement for adding a time scale to data recorded on the target.
Figure 29:
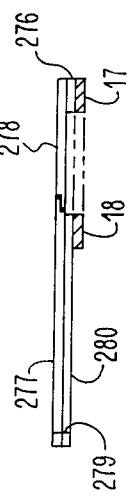
FIG. 29 is a schematic side elevational view of the structure of FIG. 28.

Referring to FIGS. 28 and 29, there is shown a system for adding a time scale to recorded data. An end base plate 276 is attached to the work area 17 in the same manner as the end base plate 12, for example. An elongated base plate 277 has a recorder 278 such as those shown and described in this application, for example, mounted on one end thereof. The recorder 278 has its target marked and advanced by suitable means mounted on the end base plate 276 in a manner such as shown and described for the end base plate 12, for example. The other end of the elongated base plate 277 is connected at 279 to an auxiliary base plate 280 by any suitable means such as an adhesive, for example.

The auxiliary base plate 280 extends beneath the elongated base plate 277 and is attached to the work area 18 in the same manner as the elongated base plate 11, for example. The auxiliary base plate 280 is formed of a material having a different coefficient of thermal expansion than the elongated base plate 277. The auxiliary base plate 280 and the elongated base plate 277 are sheathed in a suitable material such as aluminum foil or Mylar, for example. This sheath serves the purpose of enabling movement of the plates 277 and 280 while the sheath is secured to the work by a tape, for example. 277

Accordingly, the recorder 278 is not only driven by the changes in strains that occur between the areas 17 and 18 but also when temperature changes occur. Thus, this movement of the recorder 278, which is attached to the end of the elongated base plate 277, is proportional to the temperature change, the differences between the coefficients of thermal expansion of the plates 227 and 280, and the distance between the connection at 279 and the area 18.

With the temperature changes being produced by daily or seasonal temperature changes, a time cycle is added to the recording data. Furthermore, with the recorder 278 being driven by the changes in temperature, very minute strains or motion changes can be read from the recorded data.

If desired, the elongated base plate 277 may be formed of two materials, connected at a lap joint 282 as indicated in phantom lines in FIG. 28, having different coefficients of thermal expansion to produce a higher contrast of expansion between the plates 277 and 280. Furthermore, if desired, the elongated base plate 277 may be an extension of the large base plate of the recorder 278.

If the recorder 278 has a different coefficient of thermal expansion that that of the work, additional thermally effected movement will be imparted to the recorder 278.

While the present invention has shown and described marks being formed on the annular member 35 by scratches from the arm 60 or 134, it should be understood that the marks may be formed on the annular member 35 by any suitable means. For example, the annular member 35 could be marked by a pressure sensitive material magnetically.

It should be understood that our application for a Motion Tape Recorder, Ser. No. 622,230, and our application for a Motion Recorder-Indicator, Ser. No. 622,221, both filed concurrently with this application, cover similar inventions. Any ideas described in either of the copending applications and applicable to this application are considered to be a part hereof.

An advantage of this invention is that there is less drag on the target. Another advantage of this invention is that the target may be easily inserted on or removed from its support structure. A further advantage of this invention is that the strain and/or target advance movements can be amplified. Still another advantage of this invention is that only strains exceeding a predetermined amount advance the target if desired. A still further advantage of this invention is that dust and dirt cannot affect its operation. A yet further advantage of this invention is that it may be utilized in a relatively small area while producing individually separated readable strains. Yet another advantage of this invention is that temperature changes will not erroneously affect the recorded strains.

For purposes of exemplification, particular embodiments of the invention have been shown and described according to the best present understanding thereof. However, it will be apparent that changes and modifications in the arrangement and construction of the parts thereof may be restored to without departing from the spirit and scope of the invention.

We claim:

1. A recording instrument comprising first and second support means, marking means supported by said first support means, a target for recording motions in at least one of opposite senses by marks formed on said target due to movement of said marking means, said target being mounted on said second support means for movement relative thereto, said target having a groove in its periphery, target moving means adapted to engage said target to move said target intermittently in one direction in response to motions between said first and second support means, said target being removably mounted on said second support means, the improvement including:
   target support means supported by said second support means and engaging the bottom of said groove of said target to support said target.

2. The improvement according to claim 1 including means to releasably fasten said first support means and said second support means to each other until said first support means and said second support means are fixed to a work or the like.

3. The improvement according to claim 1 in which said target moving means includes means to engage the periphery of said target to move said target in the one direction.

4. The improvement according to claim 3 including preventing means engaging the periphery of said target to prevent movement of said target in a direction opposite to the one direction.

5. The improvement according to claim 4 in which said preventing means includes:
   a pair of members pivotally supported by said first support means;
   and means to continuously urge said pivotally supported members into engagement with the periphery of said target when said target is in its recording position.

6. The improvement according to claim 1 in which:
   said target support means includes a plurality of separate support members;
   first means to mount one of said support members on said second support means for movement relative to said second support means from a position in which said one support member engages the bottom of said groove of said target to a position in which said target may be removed from said second support means without engaging said one support member;
   and second means to mount another of said support members on said second support means, said second mounting means including means to resiliently urge said another support member into engagement with the bottom of said groove of said target when said target is in its recording position.

7. The improvement according to claim 6 including:
   a cover disposed over at least adjacent portions of said first support means and said second support means to cover said target and the space between said first and second support means, said cover being spaced from one side of said second support means to form an opening therebetween through which said target can be removed and inserted;
   and closing means to close the opening, said closing means including said first mounting means.

8. The improvement according to claim 7 including means to pivotally mount said closing means.

9. The improvement according to claim 7 in which:
   said cover has a plurality of openings arranged in alignment with portions of said target when said target is in its recording position to enable viewing of portions of said target from exterior of said cover;
   and means disposed on said cover to selectively close said openings in said cover.

10. The improvement according to claim 6 including preventing means engaging the periphery of said target to prevent movement of said target in a direction opposite to the one direction.

11. The improvement according to claim 10 in which said preventing means includes:
   a pair of members pivotally supported by said first support means;
   and means to continuously urge said pivotally supported members into engagement with the periphery of said target when said target is in its recording position.

12. The improvement according to claim 10 including means to pivotally support said preventing means on said second support means, said preventing means being dynamically balanced about said pivotally support means.

13. A recording instrument comprising first and second support means, marking means supported by said first support means, a target for recording motions in at least one of opposite senses by marks formed on said target due to movement of said marking means, said target being mounted on said second support means for movement relative thereto, target moving means adapted to engage said target to move said target intermittently in one direction in response to motions between said first and second support means, said target being removably mounted on said second support means, the improvement including:
   target support means supported by said second support means and engaging said target to support said target;
   said target support means includes a plurality of separate support members;
   and first means to mount one of said support members on said second support means for movement relative to said second support means from a position in which said one support member engages said target to a position in which said target may be removed from said second support means without engaging said one support member.

14. The improvement according to claim 13 including:
   second means to mount another of said support members on said second support means;
   and said second mounting means including means to resiliently urge said another support member into engagement with said target when said target is in its recording position.

15. A recording instrument comprising first and second support means, marking means supported by said first support means, a target for recording motions in at least one of opposite senses by marks formed on said target due to movement of said marking means, said target being mounted on said second support means for movement relative thereto, target moving means adapted to engage said target to move said target intermittently in one direction in response to motions between said first and second support means, said target being removably mounted on said second support means, the improvement including:
   control means to control the movement of said target moving means in response to motions between said first and second support means to control the amount of movement of said target so that the amount of movement of said target moving means is other than a one to one ratio to the amount of motion between said first and second support means.

16. The improvement according to claim 15 in which said control means includes means to reduce the amount of movement of said target by said target moving means relative to the amount of motion between said first and second support means.

17. The improvement according to claim 15 in which said control means includes means to amplify movement of said target by said target moving means.

18. The improvement according to claim 15 in which said control means includes means to prevent movement of said target by said target moving means until the motion between said first and second support means has exceeded a predetermined amount.

19. The improvement according to claim 18 in which said control means includes means to amplify movement of said target by said target moving means.

20. The improvement according to claim 18 in which said control means includes means to reduce the amount of movement of said target by said target moving means relative to the amount of motion between said first and second support means.

21. A recording instrument comprising first and second support means, marking means, lever means pivotally connected to said first support means and to said marking means to pivotally connect said marking means to said first support means, a target for recording motions in at least one of opposite senses by marks formed on said target due to movement of said marking means, said target being mounted on said second support means for movement relative thereto, target moving means adapted to engage said target to move said target intermittently in one direction in response to motions between said first and second support means, said target being removably mounted on said second support means, and said lever means including fulcrum means secured to said second support means and pivotally connected to said lever means to change the amount of motion of said marking means in response to the magnitude of the motions.

22. The recording instrument according to claim 21 including means to laterally support said marking means adjacent its marking engagement with said target to insure that said marking means does not move laterally.

23. The recording instrument according to claim 21 in which said target moving means is supported on said lever means so that the amount of motion of said target moving means in response to motions between said first and second support means is different than the amount of motion between said first and second support means.

24. The recording instrument according to claim 21 in which said lever means includes:
   a first plate disposed above said first support means;
   a second plate fixed to said first plate;
   a third plate fixed to said second support means;
   first pivot means to pivotally connect said first plate to said first support means to enable said first plate to pivotally move relative to said first support means in response to motions in either of the senses;
   second pivot means to pivotally connect said marking means to said second plate;
   and third pivot means pivotally connecting said second and third plates to each other to form said fulcrum means for said lever means.

25. The recording instrument according to claim 24 in which:
   said first pivot means includes a hub and a plurality of thin members extending from said hub in each of said first support means and said first plate, said hub and said thin members being defined by openings formed in each of said first support means and said first plate;
   said hubs of said first support means and said first plate are fixed to each other so that all motion is transmitted through said thin members of said first support means and said first plate to cause said first plate to rotate in the opposite direction to said first support means about said hubs;

said second pivot means includes a hub and a plurality of thin members extending from said hub in each of said first plate and said marking means, said hub and said thin members being defined by openings formed in each of said second plate and said marking means;

said hubs of said second plate and said marking means are fixed to each other so that all motion is transmitted through said thin members of said second plate and said marking means to cause said marking means to rotate in the opposite direction to said second plate about said hubs;

said third pivot means includes a hub and a plurality of thin members extending from said hub in each of said second and third plates, said hub and said thin members being defined by openings formed in each of said second and third plates;

and said hubs of said second and third plates are fixed to each other so that all motion is transmitted through said thin members of said second and third plates to cause said second plate to rotate in the opposite direction to said third plate about said hubs.

26. A recording instrument comprising first and second support means, marking means supported by said first support means, a target for recording motions in at least one of opposite senses by marks formed on said target due to movement of said marking means, said target being mounted on said second support means for movement relative thereto, target moving means adapted to engage said target to move said target intermittently in one direction in response to motions between said first and second support means, said target being removably mounted on said second support means, the improvement including:

said first support means comprising a first plate for securing to one area of a workpiece to have its strain recorded;

said second support means comprising a second plate for securing to another area of the workpiece and spaced from the one area;

one of said first and second plates having a longitudinal slot in one end thereof and extending in the directions of the opposite senses;

the other of said first and second plates having a tongue disposed in said slot in said one plate to align said first and second plates;

said first support means including a third plate disposed above said first plate and having said marking means supported thereby, said first plate having the same thermal coefficient of expansion as the workpiece to which it is secured;

said second support means including a fourth plate disposed above said second plate and having said target mounted thereon for movement relative thereto, said second plate having the same thermal coefficient of expansion as said first plate;

first means to connect said first plate to one of said third and fourth plates;

second means to connect said second plate to the other of said third and fourth plates;

and said first and second connecting means being disposed on a line perpendicular to the directions of the opposite senses and intermediate the overlapping ends of said one plate of said first and second plates and said tongue of said other plate of said first and second plates.

27. The improvement according to claim 26 in which:
each of said first plate and said third plate has the same configuration;
and each of said second plate and said fourth plate has the same configuration.

28. The improvement according to claim 26 in which:
one of said third and fourth plates has a longitudinal slot in one end thereof and extending in the directions of the opposite senses, said one plate of said third and fourth plates is disposed above said other plate of said first and second plates;
and the other of said third and fourth plates has a tongue disposed in said slot in said one plate of said third and fourth plates, said other plate of said third and fourth plates is disposed above said one plate of said first and second plates.

29. A pivot to pivotally connect two elements together including:
first means formed in one of the elements;
second means formed in the other of the elements;
each of said first and second means including a hub and a plurality of thin members extending from said hub, said hub and said thin members being defined by openings formed in each of the elements;
and said hubs of said first and second means being fixed to each other so that all motion is transmitted through said thin members of said first and second means to cause one of the elements to rotate in the opposite direction from the other of the elements about said hub.

30. A recording instrument comprising first and second support means, marking means supported by said first support means, a target for recording motions in at least one of opposite senses by marks formed on said target due to movement of said marking means, said target being mounted on said second support means for movement relative thereto, target moving means adapted to engage said target to move said target intermittently in one direction in response to motions between said first and second support means, said target being removably mounted on said second support means, and said target moving means including a plurality of flat springs, each of said flat springs having its greatest dimension in a plane perpendicular to said second support means.

31. The recording instrument according to claim 30 including manually operative means to engage at least one of said flat springs adjacent its engagement with said target to cause flexing of said flat springs so that release of said manually operative means causes said flat springs to lose their flexing and engage said target to advance said target.

32. The recording instrument according to claim 30 including means to limit the stress on said flat springs to prevent permanent deformation of any of said flat springs when said flat springs are moved in response to motions between said first and second support means to advance said target.

33. A recording instrument comprising first and second support means, marking means supported by said first support means, a target for recording motions in at least one of opposite senses by marks formed on said target due to movement of said marking means, said target being mounted on said second support means for movement relative thereto, target moving means adapted to engage said target to move said target intermittently in one direction in response to motions between said first and second support means, said target being removably mounted on said second support means, and preventing means engaging said target to prevent movement of said target in a direction opposite to the one direction, said preventing means including at least one member, a pin supported by said first support means having said member pivotally mounted thereon, and means continuously urging said member to a position to remove any play of said member relative to said target and to cause said member to engage said target when said target is in its recording position.

34. The recording instrument according to claim 33 in which said preventing means includes:

a pair of members pivotally mounted on said pin;

and said continuously urging means urges said members to positions to remove any play of each of said members relative to said target and to cause each of said members to engage said target when said target is in its recording position.

35. A recording instrument comprising first and second support means, marking means supported by said first support means, a target for recording motions in at least one of opposite senses by marks formed on said target due to movement of said marking means, said target being mounted on said second support means for movement relative thereto, target moving means adapted to engage said target to move said target intermittently in one direction in response to motions between said first and second support means, said second support means including first and second plates disposed adjacent each other, said first and second plates being secured to each other at one end, said second plate having its other end secured to a work area, said first plate at its other end supporting said target, and said first plate being formed of at least one material and having a different coefficient of thermal expansion than the material of said second plate.

* * * * *

UNITED STATES PATENT OFFICE
CERTIFICATE OF CORRECTION

Patent No. 4,040,062　　　　　　　　　　Dated August 2, 1977

Inventor(s)　　　Richard H. Prewitt, Jr., et al.

It is certified that error appears in the above-identified patent and that said Letters Patent are hereby corrected as shown below:

Column 9, line 35, "uoper" should read -- upper --.

Column 11, line 12, "elongate" should read -- elongated --.

Column 14, line 40, "th" should read -- the --.

Column 17, line 59, "agains" should read -- against --.

Column 17, line 68, "bot" should read -- both --.

Column 18, line 5, "enlarged" should read -- elongated --.

Column 18, line 8, "elongatd" should read -- elongated --.

Column 18, line 29, "holds" should read -- holes --.

Column 18, line 36, "232" should read -- 223 --.

Column 20, line 56, delete "277".

Column 20, line 63, "227" should read -- 277 --.

*Signed and Sealed this*

*Fifteenth* Day of *November 1977*

[SEAL]

Attest:

RUTH C. MASON　　　　　LUTRELLE F. PARKER
*Attesting Officer*　　　*Acting Commissioner of Patents and Trademarks*